Dec. 6, 1960 C. D. GILMORE 2,962,810
METHOD OF MAKING DIE ATTACHMENTS FOR DOUGHNUT MAKING MACHINES
Filed May 5, 1958 2 Sheets-Sheet 2
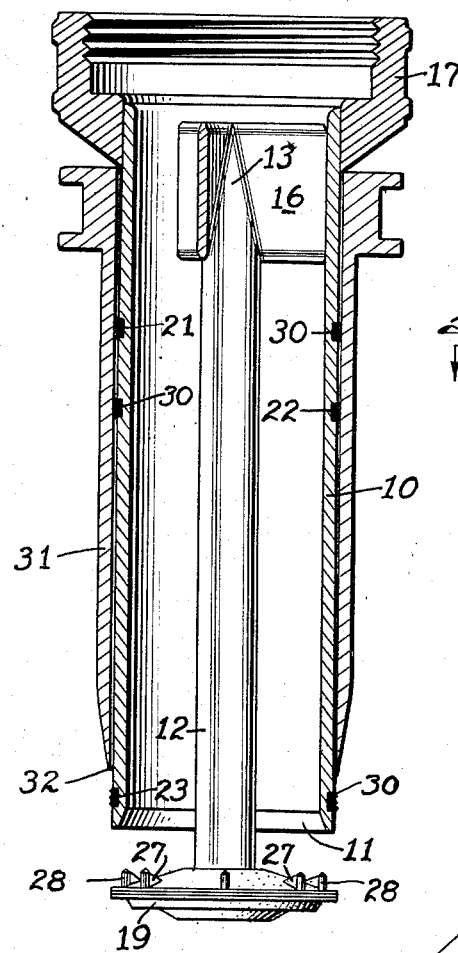
Fig. 2.
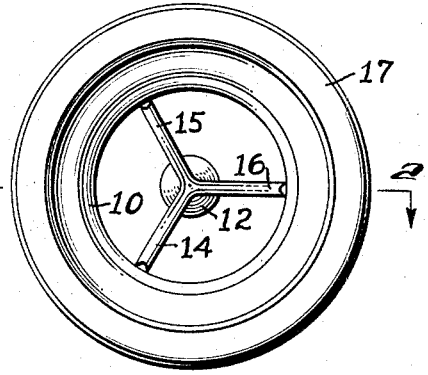
Fig. 3.
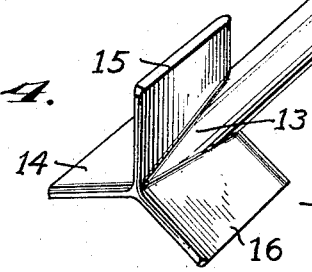
Fig. 4.
Fig. 5.
INVENTOR
CHACE D. GILMORE,
BY
ATTORNEY United States Patent Office 2,962,810
Patented Dec. 6, 1960

2,962,810

METHOD OF MAKING DIE ATTACHMENTS FOR DOUGHNUT MAKING MACHINES

Chace D. Gilmore, 219 S. Mechanics St., West Chester, Pa.

Filed May 5, 1958, Ser. No. 732,894

3 Claims. (Cl. 29—445)

This invention relates to a method of making a die assembly of a doughnut-making machine.

Commercial doughnut-making machines comprise, among other elements, a can or container of dough, a die assembly secured by a nut on the lower end of the dough can, and power mechanism for operating the die assembly to form the doughnut shape. The die assembly comprises a vertically reciprocable sleeve having a connection at its upper end with said power mechanism and having a circular knife edge on its lower end, a die tube fixed to said nut and hence fixed to the dough can to receive dough therefrom, and a circular disk fixed to a stem in turn secured to the die tube and spaced from the lower end thereof. The dough forced out of the dough can flows through the die tube and over the disk, whereupon the sleeve moves down against the disk to cut off the doughnut shape. The Bergner Patent No. 1,492,542 is illustrative of this much of the prior art.

As pointed out in the specification of my companion application Serial No. 733,802, filed May 5, 1958, concurrently with this application, commercial machines of the type indicated have given much trouble at times. The chief operating trouble is stringing or dropping of the dough, due to wearing or abuse of the moving metal parts. Sometimes the dough strings will hold the dough shape upon the end of the die tube, causing the succeeding dough shape to be malformed and causing a large gob of dough to form and fall into the hot fat. Also the strings of dough will fall into the hot fat. These gobs and strings will quickly fry to blackness, which darkens the fat and in time makes it unusable. The owner of a machine giving rise to such operating difficulties must return the die assembly to the factory for reconditioning, which is expensive, besides necessitating shutting down the machine at least temporarily, which brings production to a standstill.

To obviate these difficulties, I have proposed in the aforesaid companion application to employ (among other improvements) a disk having a flexible elastomeric periphery making direct contact with the knife edge and the inner surface of the sleeve when the sleeve is moved downwardly to cut off a doughnut shape. This wiping contact between the flexible disk periphery and the sleeve has been completely successful in eliminating the stringing of the dough. A further improvement is disclosed in my Patent No. 2,882,838 dated April 21, 1958, showing a different form of disk having a flexible elastomeric periphery for wiping contact with the knife edge and sleeve. Still further disk improvements are shown in my application Serial No. 740,486 (Case 4). All of the applications referred to in this paragraph show disks which are secured by a nut on the lower end of a stem extending axially of the die tube.

It has been found that every time any of these nuts is tightened to fix the disk on the stem, the disk will be moved radially to become eccentric. As the doughnut shape is determined by the shape and position of the disk, eccentricity of the disk will cause the doughnuts to be slightly misshapen. It is the object of this invention to provide a method for making the die tube, including its stem and disk, which will insure the forming of perfectly shaped doughnuts, with never a misshapen doughnut arising from eccentricity of the disk with respect to the die tube end.

In the accompanying drawings forming a part of this specification,

Fig. 2 is a diametric longitudinal section through the assembly, including the reciprocable sleeve; the section being on line 2—2 of Fig. 3;

Fig. 3 is a top plan view of the assembly of Fig. 2;

Fig. 4 is a perspective view of the stem with its wings; and

Fig. 5 is a detail in cross section.

Figure 1:
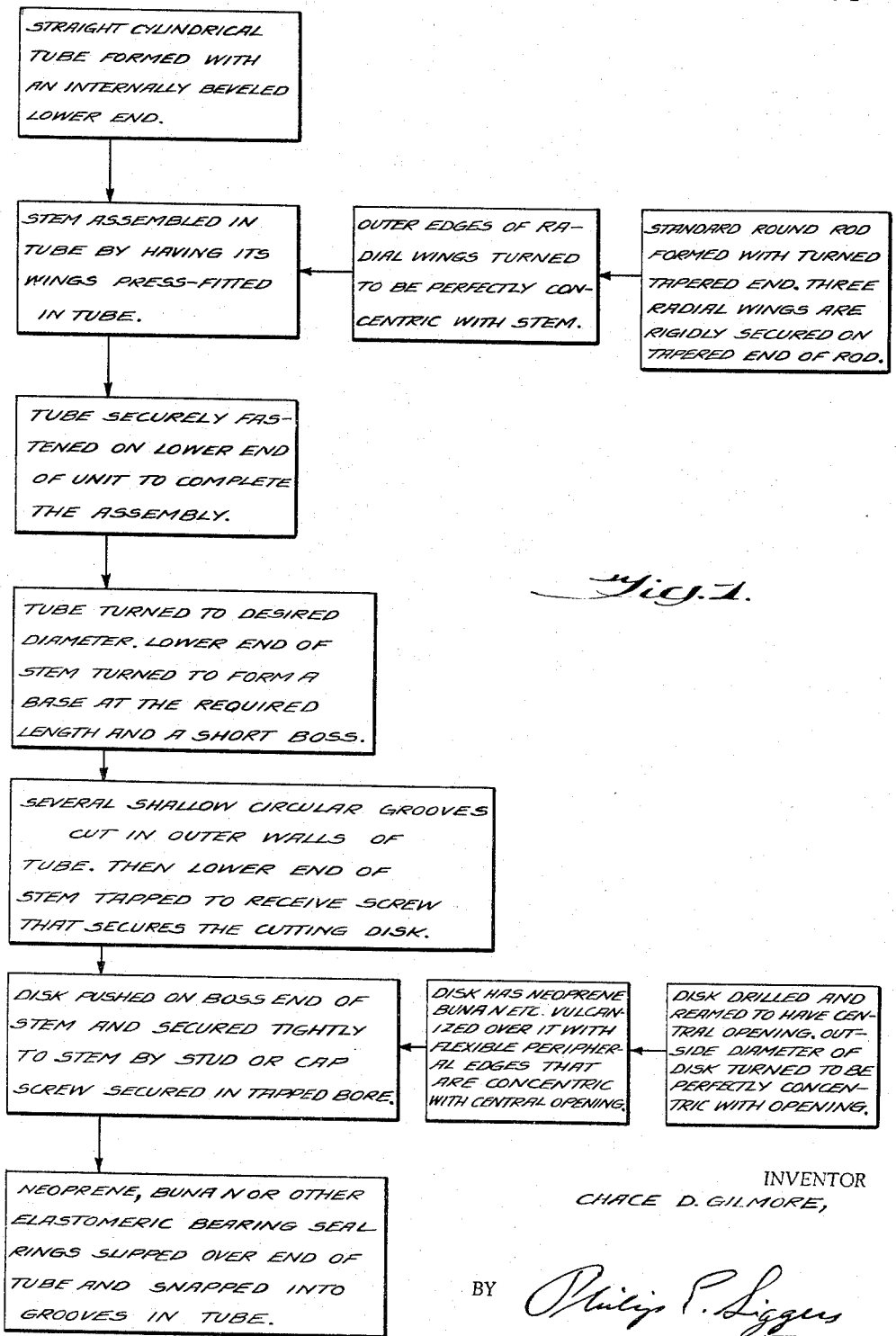
Fig. 1 is a block diagram showing the various steps of the method of my invention.

Referring particularly to the drawings, the method of of my invention involves the manufacture and assembly of a die tube including (1) the tube per se; (2) the stem; and (3) the disk that is held spaced from the lower end of the tube by the stem. These three parts are made separately and perhaps simultaneously, and as the diagram, Fig. 1, shows, are assembled to make the complete die tube of the invention which insures the formation of perfect doughnuts, with no eccentricity.

For convenience of description, the method may be said to start with the making of the die tube 10, which is a straight cylindrical metal tube formed with an internally beveled lower end 11. If preferred, the lower end of tube 10 may be initially perfectly cylindrical, with the beveling and finishing being performed in a later stage of the method, when the tube is in the lathe as will be described.

The stem 12 is formed from a standard round metal rod and one end 13 is turned to give it a taper. Three flat metal wings 14, 15, 16 are secured at their inner edges to the tapered end 13, as by brazing, soldering or welding; these wings extend radially, to lie equiangularly, 120° apart. The outer edges of the wings are then turned to be perfectly concentric with stem 12. Then the stem is secured within tube 10 to lie coaxially thereof. As the wings lie directly in the path of the dough, which is under considerable pressure, a larger number than three will increase the resistance to the flow of the dough without adding to the stability of the stem; also a larger number will add to the labor of assembling the stem. Two diametrically opposite wings could be used, but the stem would not be so strongly supported and hence will move laterally at times responsive to high pressure. I prefer that the wings be press-fitted in tube 10; but the wings could be welded, soldered or brazed to make a rigid assembly of tube and stem, with the stem projecting the desired distance below the tube end 11. The tube, with the stem attached as described, is now securely fastened, preferably by shrink-fitting, to the hollow nut 17 at its lower end. Nut 17 is a standard or commercial article, being screwed on the bottom of the dough can or container (not shown) of the doughnut-making machine.

Next the assembly of the tube, stem and nut is placed in a lathe. The lower end 11 of the tube may be turned to the desired taper and diameter. With the same setting of the lathe, the lower end of stem 12 is turned to form a base 18 which is so spaced from the tube end 11 as to provide the desired extrusion opening. Base 18 is a stop for the disk 19 to be described. Also with the same setting of the lathe, a short boss 20 is cut in the stem to have the proper diameter for a light press-fit of disk 19. The boss is made perfectly concentric with the grooves to be described. This is an essential step in the process.

Following this, one or more, preferably three, shallow circular grooves 21, 22, 23 are cut in the outer walls of tube 10. This is with the same setting of the lathe. These grooves are for elastomeric packing rings to be described. Then the lower end of the stem 12 is tapped internally, as at 24.

Meanwhile, disk 19 has been made. Disk 19 comprises a metal core 25 having a central opening 26 drilled and reamed therein. A neoprene, Buna N, or other elastomeric body is bonded and vulcanized to the metal core 25, as will be understood by reference to my application Serial No. 740,486, filed June 6, 1958 (Case 4). Disk 19 has flexible peripheral edges, due to the bonded elastomeric body, and these edges are made concentric with the central opening 26. This also is an essential part of my method. Disk 19 preferably has dough-dividing fins 27 integral with projections 28 on the upper or dough-receiving face. These are fully described and claimed in application Serial No. 740,486. Now the disk is pushed on boss 20 and is secured rigidly to the stem by a stud or cap screw 29 screwed into bore 24. The disk is then tight against the base 18, cannot wobble or shift its position in any direction, and can never lose its concentricity relative to the lower end 11 of the tube.

Next, bearing seal rings 30 of neoprene, Buna N or other suitable elastomer are slipped over the lower end of the tube and are snapped into the shallow grooves 21, 22, 23. These rings center the sleeve 31, which is slightly spaced from the tube to obviate metal to metal contact. Finally, the standard reciprocating sleeve 31 with its knife edge 32 is slid over the die tube assembly to produce the article shown in Fig. 2.

What I claim is:

1. A method of making a die assembly for extruding doughnut shapes comprising the following steps: securing a plurality of wings rigidly to one end of a straight stem to extend radially outwardly therefrom; mounting the free ends of said stem in a lathe; turning the outer ends of said radial wings to be perfectly concentric with said stem; removing said stem from said lathe; assembling the stem in a straight hollow cylindrical tube with said wings rigidly secured inside the tube at its upper end and with the stem extending axially of the tube and projecting from its lower end; securely fastening the tube at its upper end inside a nut that is adapted to support the assembly on the lower end of a dough container; mounting the free ends of said assembly in a lathe; turning the tube to the desired diameter, and with the same setting of the lathe, turning a boss on the lower end of said stem, so that the boss and the tube are perfectly concentric; removing said assembly from said lathe, forming a circular disk to have a central opening which will have a press-fit on said boss, with the outside diameter of said disk perfectly concentric with said central opening; molding an elastomeric body on the disk to make a unitary disk body with flexible peripheral edges that are concentric with said central opening; and pushing said disk on said boss and tightly securing it.

2. A method of making a die assembly for extruding doughnut shapes comprising the following steps: securing a plurality of straight wings rigidly to one end of a straight stem to extend equiangularly radially outwardly therefrom; mounting the free ends of said stem in a lathe; turning the outer edges of said radial wings to be perfectly concentric with said stem; removing said stem from said lathe; assembling the stem in a straight hollow cylindrical tube with said wings rigidly secured inside the tube at its upper end and the stem extending axially of the tube and projecting from its lower end; securely fastening the tube at its upper end inside a nut which is adapted to support the assembly on the lower end of a dough container; mounting the free ends of said assembly in a lathe; turning the tube to the desired diameter, and with the same setting of the lathe, turning a base and a boss on the lower end of said stem, so that the boss and tube are perfectly concentric; cutting a shallow circular groove in the outer walls of the tube; tapping the lower end of said stem to receive a screw or stud; removing said assembly from said lathe forming a circular disk to have a central opening which will have a press-fit on said boss, with the outside diameter of said disk perfectly concentric with said central opening; molding an elastomeric body on the disk to make a unitary disk body with flexible peripheral edges that are concentric with said central opening; pushing said disk body on said boss and tightly securing it against said base by means of a screw screwed into said tapped bore; and slipping an elastomeric ring over the end of said tube and snapping it into said shallow groove, said ring being so dimensioned that its outer surface then projects beyond the walls of said tube.

3. A method of making a die assembly for extruding doughnut shapes comprising the following steps: securing three flat wings rigidly to one end of a straight stem to extend radially outwardly therefrom, 120° apart; mounting the free ends of said stem in a lathe; turning the outer ends of said radial wings to be perfectly concentric with said stem; removing said stem from said lathe; assembling said stem in a straight hollow cylindrical tube with said three wings rigidly secured at their ends to the inside walls of said tube at its upper end, and with the stem extending axially of the tube and projecting outwardly from the lower end of the tube; securely fastening the tube at its upper end inside a nut that is adapted to support the assembly on the lower end of a doughnut dough container; mounting the free ends of said assembly in a lathe; turning the tube to the desired diameter, and with the same setting of the lathe, turning a boss on the lower end of said stem, so that the boss and the tube are perfectly concentric; removing said assembly from said lathe; forming a circular disk to have a central opening having a press-fit on said boss, with the outside diameter of said disk perfectly concentric with said central opening; and pushing said disk on said boss and tightly securing it.

References Cited in the file of this patent

UNITED STATES PATENTS

| | | |
|---|---|---|
| 1,240,530 | Baird | Sept. 18, 1917 |
| 1,629,427 | Whitworth | May 17, 1927 |
| 1,807,820 | Bergner | June 2, 1931 |
| 2,447,182 | Hutchinson | Aug. 17, 1948 |
| 2,676,552 | Hunter et al. | Apr. 27, 1954 |
| 2,797,652 | Waddel | July 2, 1957 |